Figure 16:
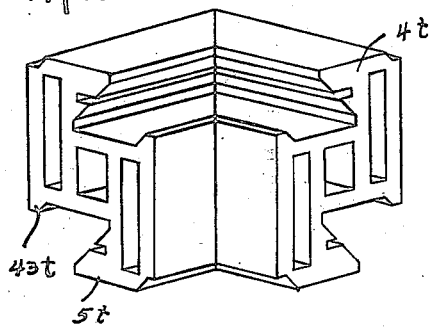

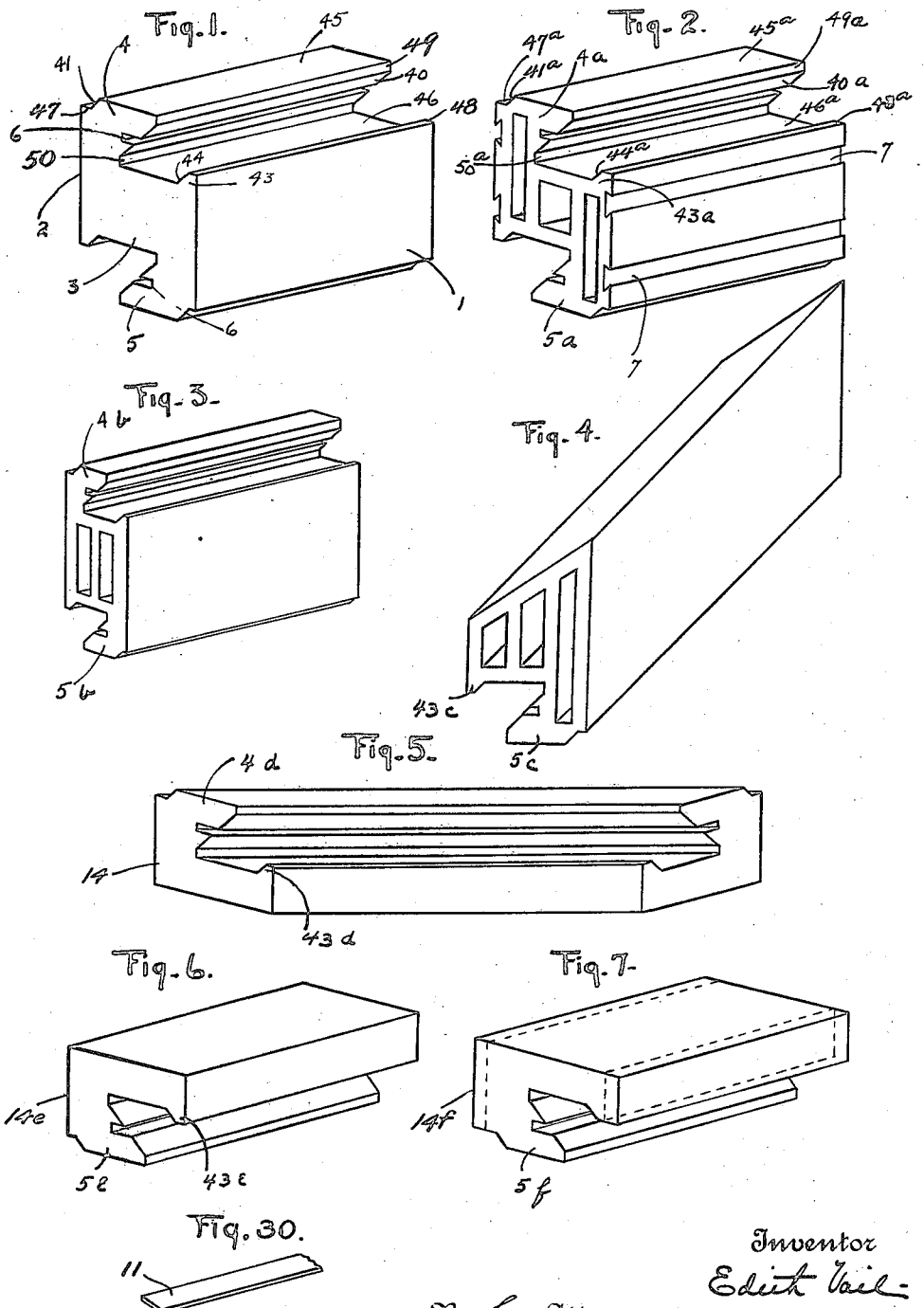

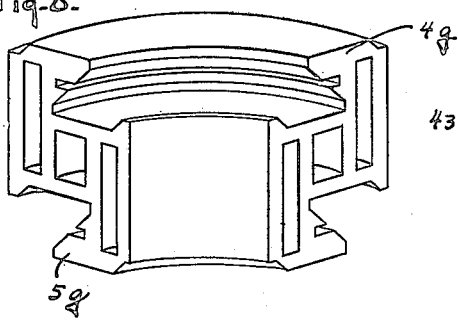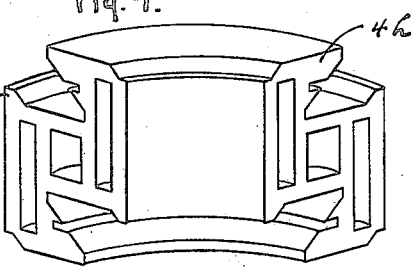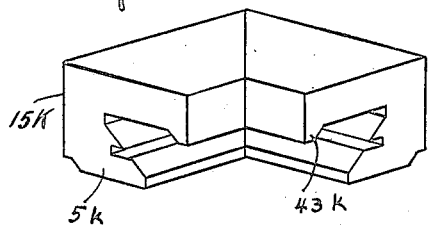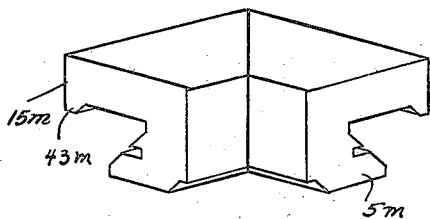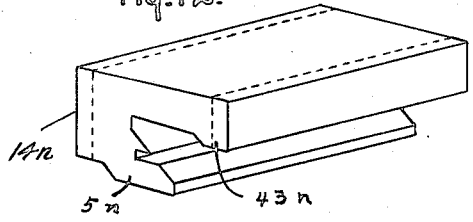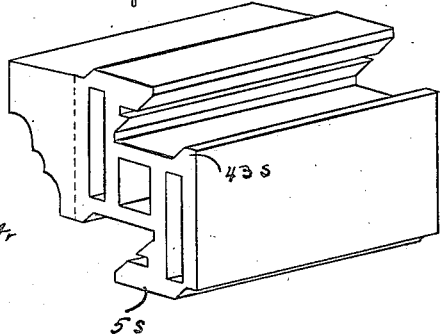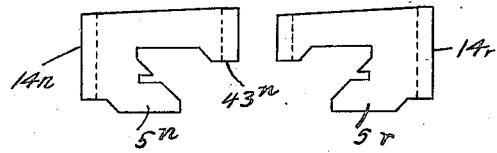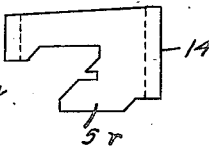

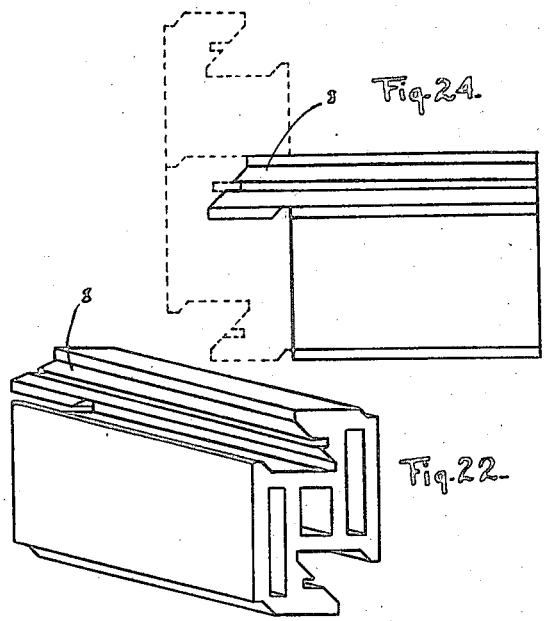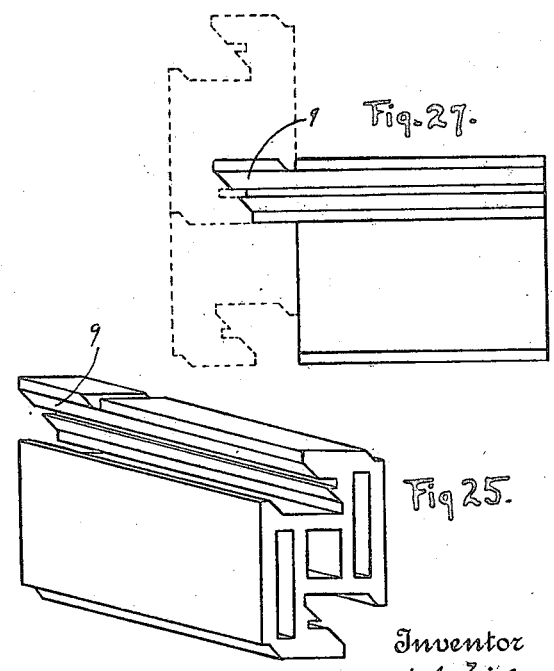

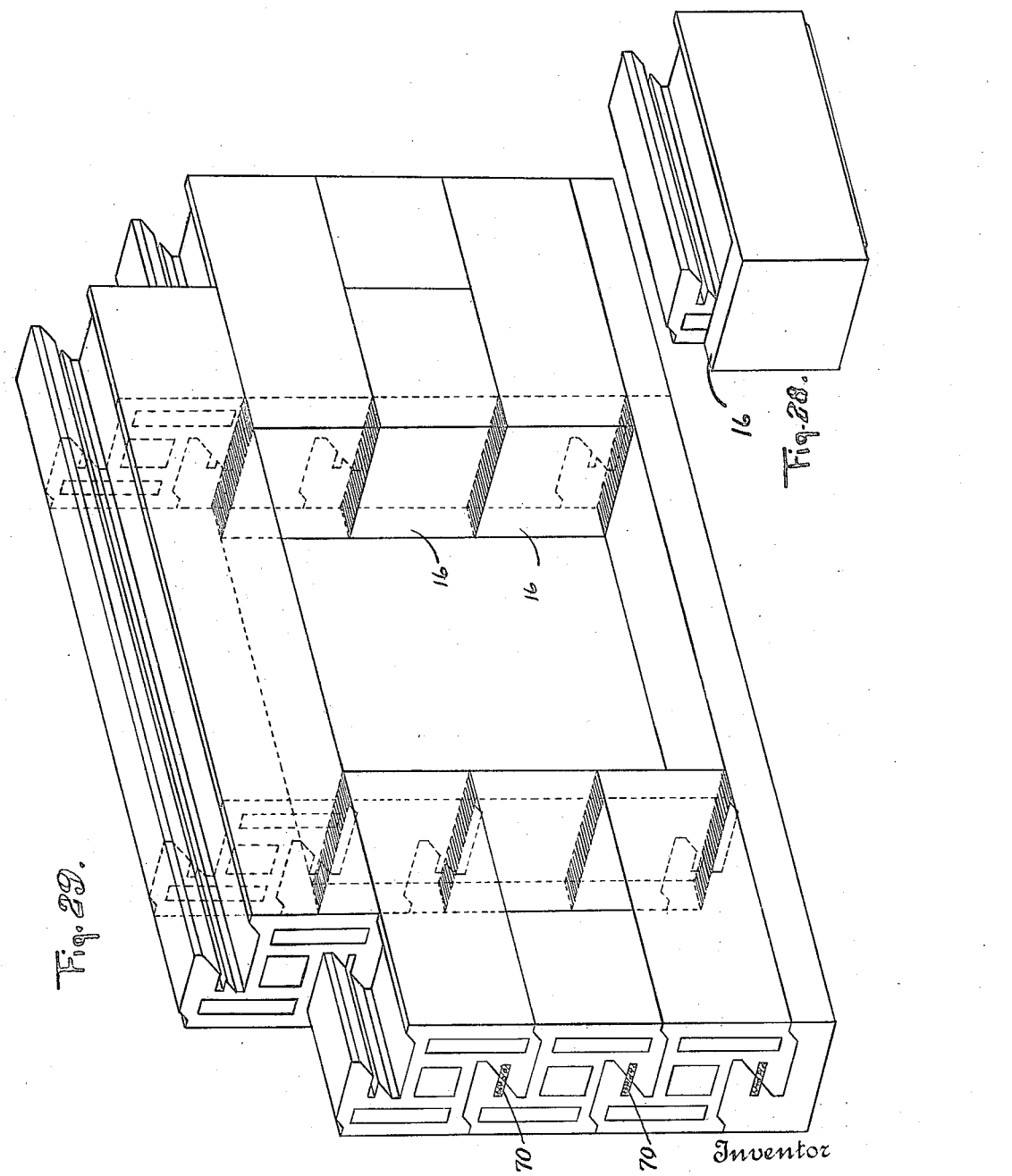

Patented Oct. 17, 1922.

1,432,222

UNITED STATES PATENT OFFICE.

EDITH VAIL, OF NEW YORK, N. Y.

CONSTRUCTION UNIT.

Application filed October 11, 1921. Serial No. 506,992.

*To all whom it may concern:*

Be it known that I, EDITH VAIL, a citizen of the United States, and a resident of the city, county, and State of New York, have invented an Improvement in Construction Units, of which the following is a specification.

The present invention relates to an improvement in building construction, one object of which is to provide a system of preformed members, units or blocks, which may be securely fitted together in different combinations to form various buildings and parts of buildings or other structures. The invention may be applied to the manufacture and use of units or blocks for dwellings, bridges, buildings, and other structures, or the units may be made in miniature for use as models, toys, or for educational or experimental purposes or for any other use to which the construction may be found applicable. Where the units are to be used for ordinary buildings or structural purposes, they may be made of concrete or other suitable composition of material having the requisite strength and durability, while the miniature units may be cut from wood or formed or molded out of any suitable material.

Whatever the intended use, it is desirable to incorporate certain features of construction to the end that each upright unit shall be balanced so far as possible to bring the center of gravity into the central vertical axial plane; that units performing the same and different functions be mutually interlocking; that the units be reversible so that they may be used with either end up or on either face; that they be interchangeable so that one may be used to replace another of the same kind; and that they can be secured together by a universal locking system regardless of their individual functional shapes. The structural features intended to accomplish the purposes hereinabove set forth and which are present in the illustrated embodiment of my invention forming the subject matter of the present application are shown in the drawings accompanying this application, and in which Figure 1 is a form of wall block shown in perspective, Figure 2, a modified form showing the surfaces undercut to receive a coating of or plaster or the like, Figure 3, a block similar to that shown in Figure 1 but relatively narrower and intended to be used principally for partitions to be inserted in any building already erected or in any other suitable place, Figure 4, a filler unit intended more particularly to fit between the rafters and to carry the wall up directly into contact with a sloping roof, Figure 5, a foundation sill, Figure 6, a door sill, Figure 7, a window sill, the portions outside of the dotted lines indicating the overhanging portions both inside and outside beyond the normal inside and outside surfaces of the wall, Figure 8, a block intended to form a portion of a circular construction or a rounded corner built up from the inside, Figure 9, a similar block to be used where the construction is developed from the outside, Figure 10, a corner coping block to be applied from the outside, Figure 11, a coping block to be applied from the inside, Figure 12, a sill block having an inclined upper surface for drainage, Figure 13, an end view of the same, Figure 14, an end view of a sill block to be applied from the inside, Figure 15, a view in perspective of a form of cornice block to be applied from the inside, Figure 16, a corner block to be used where the construction is carried on from inside, Figure 17, a corner block to be used where the construction is carried on from the outside, Figures 18 and 19, modified forms of corner blocks for different angles of construction, Figure 20, a reversing wall block, Figure 21, a reversing corner block, Figure 22, a view in perspective of a partition block, Figure 23, a normal wall block having an opening to receive the form of partition block shown in Figure 22, Figure 24, a side elevation of said partition block, Figure 25, a modified form of partition block, Figure 26, a normal wall block having an opening to receive the form of partition block shown in Figure 25, and used when constructing a wall from the outside, Figure 27, a side view of the modified form of partition block shown in Figure 25, Figure 28, a form of unit for facing openings, Figure 29, a group of units assembled to illustrate the arrangement of blocks for forming an arch door or window opening, and Figure 30, a view in perspective of a form of spline.

Referring to the drawings, a preferred form of wall unit is illustrated in Figure 1 and comprises inner and outer surface presenting portions 1 and 2, respectively, connected by an intermediate body portion 3 which may be either solid or hollow as shown. At opposite sides of the body portion I provide diagonally arranged interlocking members or extensions 4 and 5, respectively, which are undercut to, form with the body portion, extension receiving grooves. Each extension has a longitudinal channel 6 adapted to receive a spline or shear resisting member which may be like that shown at 11 in Figure 30. The parts of the unit illustrated in Figure 1 and thus far identified are so positioned and proportioned that each block is evenly balanced and in the preferred form will stand securely on any face as a supporting base independently of other blocks or supporting members. The extensions 4 and 5 on all units for a given structure are preferably of the same size and shape and are so arranged that an extension 5 of any one block will fit effectively in the extension receiving groove of any other block and when assembled will remain in secure engagement therewith. To further insure secure interlocking of the units, a spline or shear resisting member of wood, metal, concrete, or other suitable material, depending in each case on the structural requirements, occupies the channels 6, it being understood that when the units are assembled, the opposed channels 6 of cooperating units will register to form a spline slot. Obviously, the units or blocks may be made of various shapes and dimensions to suit different requirements. As illustrated in Figure 2, the exterior and interior surface presenting portions may be grooved as at 7 to form recesses for retaining concrete, cement, stucco, or any other surfacing material, in position as an outer or inner coating or finish.

Referring more particularly to Figure 1, which clearly illustrates a practicable form of what I refer to in this application as my "typical interlocking means", applicable to all forms of units, the extension 4, for example, has an inclined interiorly exposed shearing contact surface or face 40 and an exteriorly exposed contact surface or face 41 parallel thereto. Opposite the extension 4 is an abutment 43 also provided with an inclined shearing contact surface or face 44 parallel with the face 40 of said extension, said faces 44 and 41 being equidistant from the face 40. To provide effective supporting surface in addition to the shearing contact surface for a wall unit, such as that shown in Figure 1, and when the assembly proceeds in a vertical direction, the extension 4 in the preferred form has an outwardly exposed face 45 normal to and intersecting the longitudinal vertical median plane of the unit. The importance of having the face 45 intersect the median plane of the unit is that this construction affords a supporting surface at both sides of said plane and thus assists in rendering each individual unit inherently balanced and capable of standing independently. In this respect my improved construction unit is different from any and all other blocks or units of which I have knowledge. It will be clear that the face 45 has a counterpart in the face 46 of the extension receiving groove so that in assembling, the face 45 of one interlocked unit contacts with or is supported upon the face 46 of the other unit and the face 46 of the first unit contacts with or is supported upon the face 45 of said other unit, depending upon whether the units are assembled horizontally or vertically. It is contemplated, however, that the best results will follow in building construction if the units are assembled vertically or one on top of another to the required height.

While the area of the faces 45 and 46 may obviously be varied to some extent, it is desirable under ordinary conditions to make said faces as large as possible for any given unit and still retain the inclined face 41 on the extension and the corresponding face 44 on the abutment 43. In this manner, the actual interlocking supporting surface as distinguished from shearing contact surface is increased and in like degree increases the stability of assembled units. This is further insured by providing additional supporting surfaces 47 on the extension 4 and 48 on the abutment 43, Figure 1, disposed along opposite edges of the units and forming effective support against lateral rocking of one unit on a supporting unit. With the surfaces 45 and 46 of maximum area for a given block and with the surfaces 47 and 48 of substantial area, it is possible to provide a greater aggregate area of interlocking supporting contact surface than is possible with an ordinary construction unit such as a brick or a tile.

The interlocking effectiveness of my improved interlocking means is further increased by providing spaced parallel faces 49 and 50 of equal area on the extension 4, and inclined relatively to the face 40. In the drawings, the faces 49 and 50 are shown parallel to the longitudinal median plane of the unit, although they may obviously be inclined with respect thereto, within certain limits, without departing from the contemplated scope of my invention. Furthermore the area of faces 49 and 50 may be varied to conform to different structural requirements. The proportionate areas of the various faces involved in my improved interlocking construction as shown in the drawings, and the relative positioning of said faces have been determined carefully and are believed to be suitable for the greatest number of structural uses, as compared with any other combination thus far evolved and within the contemplated field of my invention.

While the normal wall block is formed preferably as shown in Figures 1 and 2, or an equivalent thereof, other unit forms will be found necessary or desirable in the construction of various kinds of buildings. Some of these forms are shown for purposes of illustration in more or less detail in the drawings presented herewith and from which the method of use will be obvious, it being noted that in practically all cases the modified form of block is provided with my typical form of locking or interlocking means, whether the contemplated construction be carried on from within the structure or without the structure, and regardless of the particular structural function of the unit. It is contemplated that circumstances may require the builder to change from inside to outside construction, or vice versa or, in other words, to reverse the direction of assembly in which case the reversing blocks shown in Figures 20 and 21 may be utilized.

In forming partitions or abutting walls, it is desirable to have the partition blocks interlock effectively not only with each other, but also with the units forming the walls at either end of the partition. Accordingly, a form of partition block is provided which has a projecting end portion 8 (Figures 22 and 24), said end portion being adapted to cooperate with the type of wall unit with which construction is carried on from within. Where the construction is carried on from outside, or the reverse of that shown in Figure 23, the partition block will include a locking portion 9 (Figures 25 and 27).

The partition blocks as well as others are positively locked together by means of removable splines 11 cooperating with the spline grooves of the interlocking portions of adjacent blocks, or the splines may be of mortar, concrete or other suitable material for permanent construction, as at 70, Figure 29.

In order that any given wall may present a normally continuous surface, my improved construction also contemplates the use of sills or half blocks 14 having a flat bottom wall supporting surface and a typical interlocking portion adapted to cooperate with similar portions on the wall forming blocks. The member 14 is reversed to form window or door sills $14^f$ and $14^e$, respectively, or to form a coping or top members $15^k$ and $15^m$, particulary where used in finishing or topping an ordinary enclosing wall.

A sill member having an inclined upper surface for drainage purposes is shown at $14^n$, while a similar block for application from the inside is shown at $14^r$.

Unless some additional unit were provided other than those thus far described, the openings through a wall constructed as indicated would display joints of irregular contour where adjacent blocks are locked together. To cover these joints and to improve the structural appearance of the assembled units, a suitable form of facing unit, as shown in Figure 28, is provided which is substantially like the previously described wall block except that it has a projecting portion 16 extending from one end and so positioned that the corresponding portions of superposed units will form a facing or exposed surface resembling that of ordinary masonry in appearance.

As shown in Figure 2, a modified form of construction unit may be provided with locking means similar to those described in connection with the form of block illustrated in Figure 1. Thus, said modified form of block is provided with interlocking extensions $4^a$ and $5^a$, said extension $4^a$ having an inclined interiorly exposed shearing contact face $40^a$ and an exteriorly exposed contact face $41^a$. An abutment $43^a$ is provided with an inclined shearing contact face $44^a$ parallel with the face $40^a$ of the extension $4^a$. The extension $4^a$ has an outwardly exposed bearing surface $45^a$ which is parallel to and of equal area with an interiorly positioned bearing face $46^a$. Additional supporting surfaces $47^a$ and $48^a$ are provided and the extension $4^a$ has spaced parallel faces $49^a$ and $50^a$ of equal area and disposed parallel to the longitudinal median plane of the unit.

In Figure 3, $4^b$ and $5^b$ represent extensions on a modified form of construction unit.

As shown in Figure 4, $5^c$ represents an interlocking extension and $43^c$ an abutment on a modified form of construction unit.

In Figure 5, $4^d$ represents an interlocking extension and $43^d$ an abutment on a modified form of construction unit.

In Figure 6, $5^e$ represents an extension and $43^e$ an abutment on a door sill unit.

In Figure 7, $5^f$ represents an interlocking extension on a window sill unit.

In Figure 8, $4^g$ and $5^g$ represent interlocking extensions on a form of unit intended for circular or rounded corner construction.

In Figure 9, $4^h$ is an interlocking extension and $43^h$ an abutment on a modified form of unit intended for circular or rounded corner construction.

In Figure 10, $5^k$ is an interlocking extension as applied to a corner coping unit and $43^k$ an abutment on a similar form of unit.

In Figure 11, $5^m$ is an interlocking extension and $43^m$ is an abutment on a modified form of coping unit.

In Figures 12 and 13, $5^n$ represents an interlocking extension and $43^n$ an abutment on a sill block.

In Figure 14, $5^r$ represents an interlocking extension on a modified form of sill block.

In Figure 15, $5^s$ represents an extension and $43^s$ an abutment on a form of cornice block.

In Figure 16, $4^t$ and $5^t$ represent interlocking extensions and $43^t$ an abutment on a form of corner block.

Figure 17:
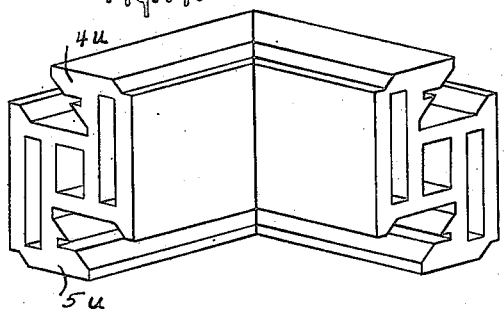

In Figure 17, $4^u$ and $5^u$ represent interlocking extensions on a modified form of corner block.

Figure 18:
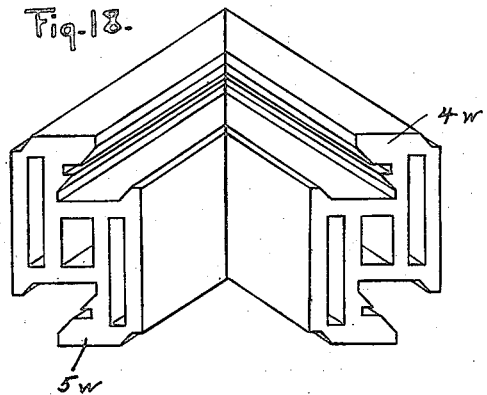

In Figure 18, $4^w$ and $5^w$ represent interlocking extensions on another form of corner block.

Figure 19:
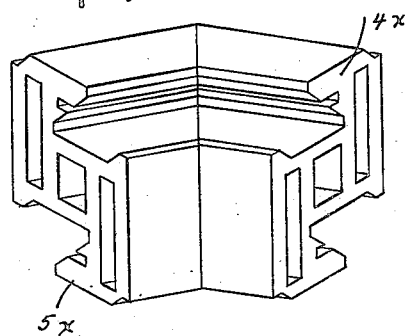

In Figure 19, $4^x$ and $5^x$ represent interlocking extensions on another modified form of corner block.

Figure 20:
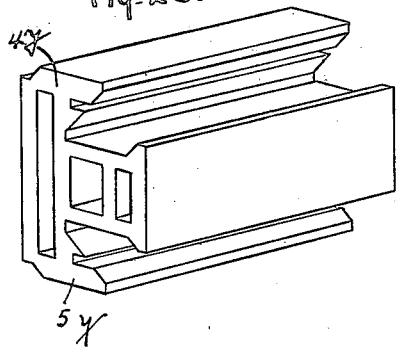

In Figure 20, $4^y$ and $5^y$ represent interlocking extensions on one form of reversing wall block.

Figure 21:
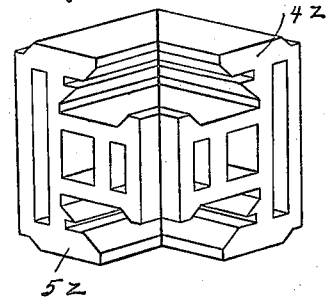

In Figure 21, $4^z$ and $5^z$ represent interlocking extensions on a form of reversing corner block.

From the foregoing description of my improved construction units and their manner of use and assembly, it will be apparent that, as to the wall forming units I provide an inherently balanced structure which when assembled affords a rigidity and a stability which are not attainable in using unbalanced units. Furthermore, by providing the various types of units with an effective form of interlocking means, the same in all units, I make available an economical structural system of wide adaptability. This advantage is measurably increased by providing various forms of units with interlocking means at both ends so that either end may be interlocked with the interlocking means of any other unit. By standardizing the various functional types as to size and shape, the units become interchangeable, a feature which suggests obvious advantages not alone in erecting buildings, but in various other uses and also in utilizing the units in miniature form as models, toys, or for educational or experimental purposes.

I am aware that construction units have been devised with interlocking means intended to permit assembly by moving one unit toward another either in a direction parallel to the axial plane of the units or normal thereto. With my construction, however, the characteristic assembling movement is oblique or inclined with respect to said plane and my shear resisting member or spline is disposed between interlocked units in a way to most effectively prevent relative displacement. However, it is contemplated that cooperating units embodying my invention may be assembled by sliding one into the other from either end.

Whichever method of assembly is followed, the interlocking features of applicant's units will afford a substantial resistance to separation of said units where the separating force is acting in a vertical direction. This is true in many forms of the block without the use of a spline. However, where a suitable spline is used, the interlocked units cannot be separated by any ordinary strain which will not break the spline.

I claim as my invention:

1. A construction unit comprising a body portion having means for interlocking with similar means on another unit, said means including an extension from said body portion and a groove partly underlying said extension and adapted to receive and interlock with an extension from another similarly equipped unit, said groove having parallel extension guiding and retaining surfaces.

2. A construction unit comprising a body portion and interlocking means arranged at one side thereof and consisting of an undercut extension having an interiorly obliquely disposed face overlying the body portion and said body portion having a face parallel with and disposed opposite to said obliquely disposed face and cooperating therewith to guide and retain an undercut extension on another similarly equipped unit when the same are assembled in interlocking contact.

3. A construction unit comprising a body portion and means for assembling and interlocking said unit with another unit having similar means, said means including a groove and an extension, said groove having parallel inclined faces and a supporting or contact face interposed between and intersecting said inclined faces and said extension having a supporting or contact face positioned and adapted to engage the supporting or contact face of the groove of a cooperating unit when corresponding parts of said cooperating unit are positioned in assembled relation with said inclined faces.

4. A construction unit comprising a body portion and means for interlocking with another unit having similar means including an undercut extension, an abutment whereby lateral movement between cooperating units is prevented and an extension receiving groove positioned between said extension and said abutment.

5. A construction unit comprising a body portion and means for interlocking with another unit having similar means including an undercut extension having an obliquely disposed face, an abutment having a face parallel to said obliquely disposed face of the extension and an extension receiving groove positioned between said extension and said abutment.

6. A construction unit comprising a body portion and means for interlocking with another unit having similar means including an undercut extension having an inclined face on its undercut side and a face parallel thereto on its outwardly exposed side, a groove to receive a similar extension on a cooperating unit, and an abutment spaced from said inclined face and having an inclined face opposed to and parallel with the inclined face on said undercut side of the extension.

7. A construction unit having a body portion and means for interlocking with similar means on another unit, said means consisting of an extension offset from said body portion and undercut to form an inclined face on one side, a similarly inclined face on the opposite side of said extension, and an extension receiving groove having a similarly inclined face spaced from said extension, said two last mentioned inclined faces being parallel with the first mentioned inclined faces and equidistant therefrom.

8. A construction unit comprising a body portion and means for interlocking with another unit having similar means, said means including a groove and an undercut extension being adapted to interlock with a similar groove in a cooperating unit and having an inclined face on its undercut side and parallel faces intersecting said inclined face, one at the inner edge and the other at the outer edge thereof.

9. A construction unit comprising a body portion and means for interlocking with another unit having similar means, including an undercut interlocking extension and an extension receiving groove, said extension and said groove having in common an inclined face on the undercut side of the extension and parallel faces intersecting said inclined face at the lateral edges thereof, said extension having an exteriorly exposed supporting face intersecting one of said parallel faces and said groove having a relatively interiorly exposed supporting face parallel to said exteriorly exposed supporting face, the parts being so positioned and proportioned that the exposed supporting face of an interlocking extension of one unit engages the interiorly exposed face of the groove of another unit when said units are assembled in interlocked relation.

10. A construction unit comprising a body portion and means for interlocking with another unit having similar means, including an undercut interlocking extension, an abutment, and an extension receiving groove between said extension and said abutment, said extension having an inclined face and spaced parallel faces intersecting said inclined face at opposite edges thereof.

11. A construction unit comprising a body portion and means for interlocking with another unit having similar interlocking means, including an undercut interlocking extension having an inclined shearing contact face on its undercut side, a shearing contact face on its opposite exposed side parallel to said first mentioned shearing contact face, and a supporting face intersecting said second mentioned shearing face along its outer edge, and an abutment spaced from said extension and having an inwardly exposed shearing contact face and a supporting face intersecting said last mentioned inwardly exposed shearing contact face along its outer edge, whereby when the units are assembled the outermost contact face of an extension of one unit will engage the contact face of an abutment of the other unit to minimize relative lateral rocking movement between said units.

In testimony whereof, I have signed my name to this specification this October 4th 1921.

EDITH VAIL.